United States Patent [19]

Genge et al.

[11] Patent Number: 5,449,036
[45] Date of Patent: Sep. 12, 1995

[54] METHOD AND APPARATUS FOR REDUCING WATER VAPOR IN EXHAUST GAS FROM EVAPORATIVE HEAT EXCHANGE SYSTEMS

[76] Inventors: John P. Genge, 86 Village Road, St. Catherines, Ontario, Canada, L2T 3C1; Clarence T. Moss, Jr., 4252 Day Rd., Lockport, N.Y. 14094

[21] Appl. No.: 185,680

[22] Filed: Jan. 24, 1994

[51] Int. Cl.⁶ .................................................. F28D 15/00
[52] U.S. Cl. ................................ 165/104.19; 165/900; 261/DIG. 11; 261/DIG. 77
[58] Field of Search .......................... 165/900, 104.19; 261/DIG. 77, DIG. 11, 109, 152, 153

[56] References Cited

U.S. PATENT DOCUMENTS

| | | | |
|---|---|---|---|
| 3,592,122 | 7/1971 | Hughes | 261/DIG. 77 |
| 3,802,675 | 4/1974 | Cates | 261/111 |
| 3,923,935 | 12/1975 | Cates | 261/159 |
| 3,925,523 | 12/1975 | Cates | 261/DIG. 77 X |
| 4,315,873 | 2/1982 | Smith | 261/158 |
| 4,367,183 | 1/1983 | Carbonaro | 261/159 |
| 4,397,793 | 8/1983 | Stillman et al. | 261/DIG. 77 |
| 4,476,065 | 10/1984 | McKey | 261/DIG. 11 X |
| 4,514,344 | 4/1985 | Ruscheweyh | 261/DIG. 11 |
| 4,662,902 | 5/1987 | Meyer-Pittroff | 261/DIG. 77 |

FOREIGN PATENT DOCUMENTS

50-101177 2/1977 Japan .
489918 2/1938 United Kingdom .

*Primary Examiner*—Martin P. Schwadron
*Assistant Examiner*—L. R. Leo
*Attorney, Agent, or Firm*—Baker & Daniels

[57] ABSTRACT

A method for reducing the amount of water vapor in gas exhausted from closed loop evaporative heat exchange systems wherein the low energy air which has been warmed and moistened within the heat exchange system is mixed with cooler air to condense moisture out of the low energy air for recovery and reuse. Various methods and apparatus for controlling and effecting the mixing are disclosed.

13 Claims, 7 Drawing Sheets

METHOD AND APPARATUS FOR REDUCING WATER VAPOR IN EXHAUST GAS FROM EVAPORATIVE HEAT EXCHANGE SYSTEMS

FIELD OF THE INVENTION

The present invention relates to a novel method of operating closed loop evaporative heat exchange systems. More specifically, the present invention relates to a novel method of reducing the amount of water vapour in the exhaust gas from a closed loop evaporative heat exchange system. The present invention also relates to a novel closed loop evaporative heat exchange system.

BACKGROUND OF THE INVENTION

Closed loop evaporative heat exchange systems are known and used in a wide variety of applications, from thermal power generation to process plants. Such systems typically include at least one closed loop pipe bundle, or coil, through which a working fluid to be cooled is passed. The pipe bundles are located in one or more plenums through which low energy air passes and the pipe bundles are subjected to a water spray. Heat energy is rejected (transferred) from the working fluid through the evaporation of a portion of the water spray and the resulting water vapour transfers some of its heat energy to the low energy air. The un-evaporated sprayed water collects in a basin at the bottom of the plenum and is recirculated to the spray heads as required.

Problems exist with prior art closed loop evaporative heat exchange systems in that, as the low energy air is heated by the heat energy rejected by the working fluid, its ability to carry additional moisture is increased (i.e.—its relative humidity is decreased). Water vapour from the sprayed water therefore mixes with the low energy air to raise its relative humidity. This increase in the water vapour content of the low energy air leads to two problems, namely: the water vapour which is absorbed by the low energy air must be replaced in the system, requiring a supply of make-up water; and, under some circumstances such as cool ambient air conditions, the vapour condenses out of the air exhausted from the heat exchange system leading to a visible plume (fog) and/or localized precipitation. In the latter case, in cold weather, misting or even icing of facilities adjacent the system may occur.

When the heat exchange system is employed at a plant located in a remote location, make-up water may be difficult or expensive to obtain. Also, the spray water in closed loop evaporative heat exchange systems is often chemically treated to prevent scaling, etc. from occurring in the system and thus make-up water must also have such chemicals added incurring additional operating costs. Further, the constant replenishment of evaporated spray water results in the concentration of contaminants such as minerals, etc. in the water in the system. To prevent damage to the pipe bundles, this concentration must be controlled by the periodic bleed-off and replacement of at least a portion of the water from the system. This requires additional makeup water and chemicals and, of course, the bleed-off water must be processed to remove any undesired chemicals and/or contaminants prior to its entry into the environment. This processing may involve significant additional expense.

In many circumstances, a visible plume (fog) from a plant is undesirable or unacceptable. For example, plants exhausting a visible plume are often the subject of attack by environmentalists. Further, a visible plume can exclude many desired sites at which a closed loop evaporative heat exchange system could otherwise be located, such as sites adjacent airports, highways, recreational areas, etc. Of course, the transformation of the water vapour in the plume into rain or ice in cold weather also results in dangerous or undesirable conditions adjacent the plant.

Previous attempts have been made to treat the air exhausted from closed loop evaporative heat exchange systems such that a plume is not formed, or only forms a suitable distance downstream from the system. For example, U.S. Pat. No. 3,923,935 to Cates shows a parallel path wet-dry cooling tower wherein the working fluid is first passed through a dry coil and then a wet-coil. Prior to the exhaust air from the wet-coil leaving the system, it is mixed with the exhaust air from the dry coil to decrease the avenge moisture content (and relative humidity) of the exhaust air. U.S. Pat. No. 4,367,183 shows a system similar to the Cates reference wherein a mixing device is provided to mix the exhaust air from the wet and dry coils.

In many contemporary systems, a reheat means is provided adjacent the exhaust port to raise the temperature of the exhaust gas and thus reduce its relative humidity.

Problems exist with these prior art systems, and all of those of which the present inventors are aware, in that they still require make-up water to replace the sprayed water absorbed by the cooling air and, in many cases, require an additional reheat means.

SUMMARY OF THE INVENTION

It is an object of the present invention to provide a novel method of operating a closed loop evaporative heat exchange system which obviates or mitigates at least one of the above-mentioned problems of the prior art. It is a further object of the present invention to provide a novel evaporative heat exchange system.

According to a first aspect of the present invention, there is provided a method of reducing water vapour in exhaust gas from a closed loop evaporative heat exchanger system, comprising the steps of:

(i) passing a working fluid to be cooled through at least one closed loop heat exchanger;

(ii) applying a water spray to said at least one heat exchanger to wet its surface;

(iii) passing air of lower energy than said working fluid past said at least one heat exchanger, said lower energy air acquiring heat energy from said at least one heat exchanger and acquiring water vapour from an evaporated portion of the water spray applied to said at least one heat exchanger to form warm moist air;

(iv) collecting un-evaporated water spray in a collection means;

(v) mixing, in a region adjacent to said at least one heat exchanger which is traversed by said un-evaporated water spray, the warm moist air with an amount of cooler air to condense at least a portion of the water vapour in the mixture to obtain exhaust air and condensed water vapour;

(vi) recovering at least a portion of the condensed water vapour for reuse;

(vii) exhausting said exhaust air from said heat exchange system.

According to another aspect of the present invention, there is provided a closed loop evaporative heat exchanger system comprising: at least one closed loop heat exchanger; means to provide a water spray onto said at least one heat exchanger; means to supply low energy air past said at least one heat exchanger; means to supply cooler air; means to mix, within a region traversed by an un-evaporated portion of said water spray, said cooler air with the low energy air which has passed said at least one heat exchanger to condense water vapour therefrom; means to collect an un-evaporated portion of said water spray and said condensed water vapour; and exhaust means to exhaust said mix of cooler air and low energy air from said heat exchange system.

Preferably, the cooler air is ambient air. Also preferably, a control means is provided to alter the relative amount of cooler air in the mixture of cooler air and warm moist air.

BRIEF DESCRIPTION OF THE DRAWINGS

Preferred embodiments of the present invention will now be described, by way of example only, with reference to the attached figures wherein.

DETAILED DESCRIPTION OF THE PREFERRED EMBODIMENTS

As used herein, the term closed loop evaporative heat exchanger system comprises any heat exchange system wherein a water spray is employed to assist energy transfer from the working fluid in a closed loop heat exchanger comprising pipe bundles or the like to lower energy air.

Figure 1:
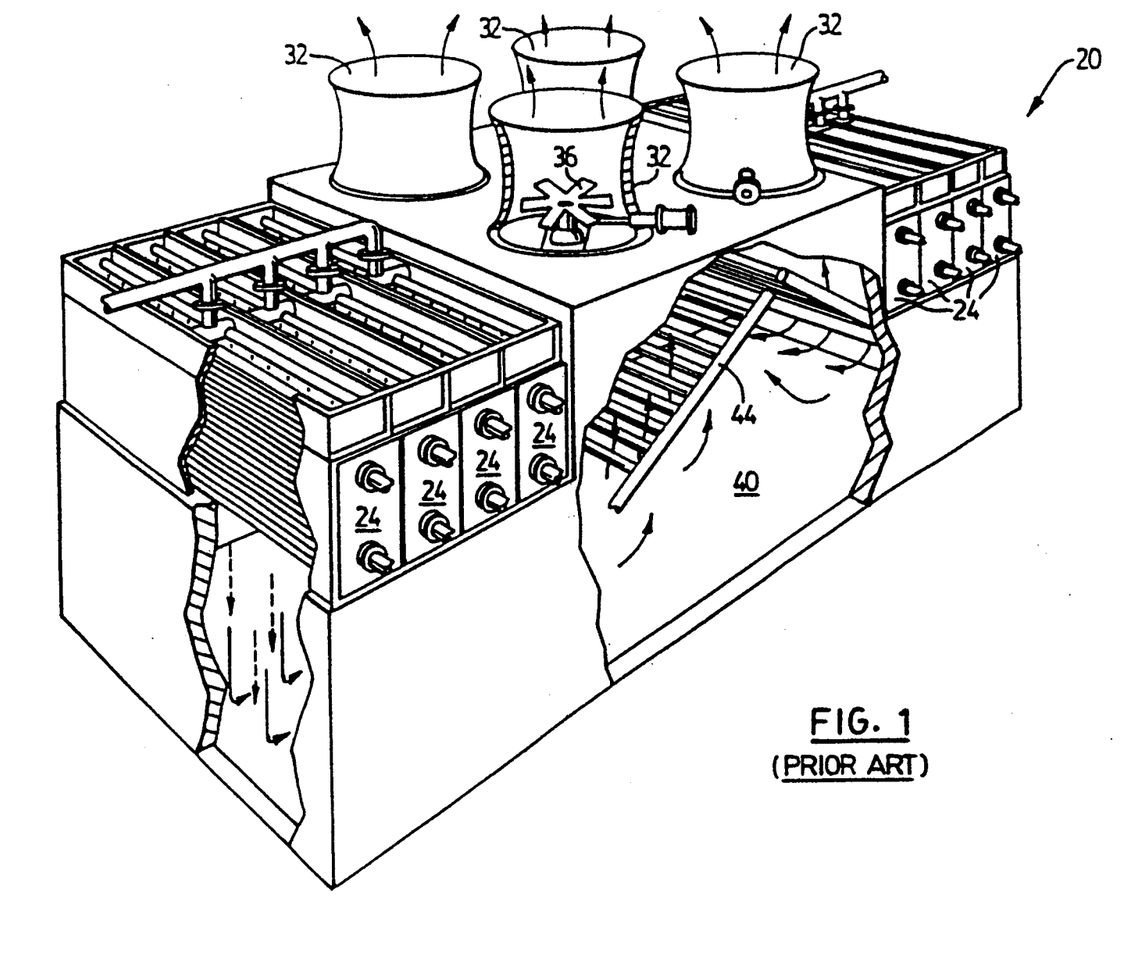
FIG. 1 shows a cut-away, perspective view of a prior art closed loop evaporative heat exchanger system.
Figure 2:
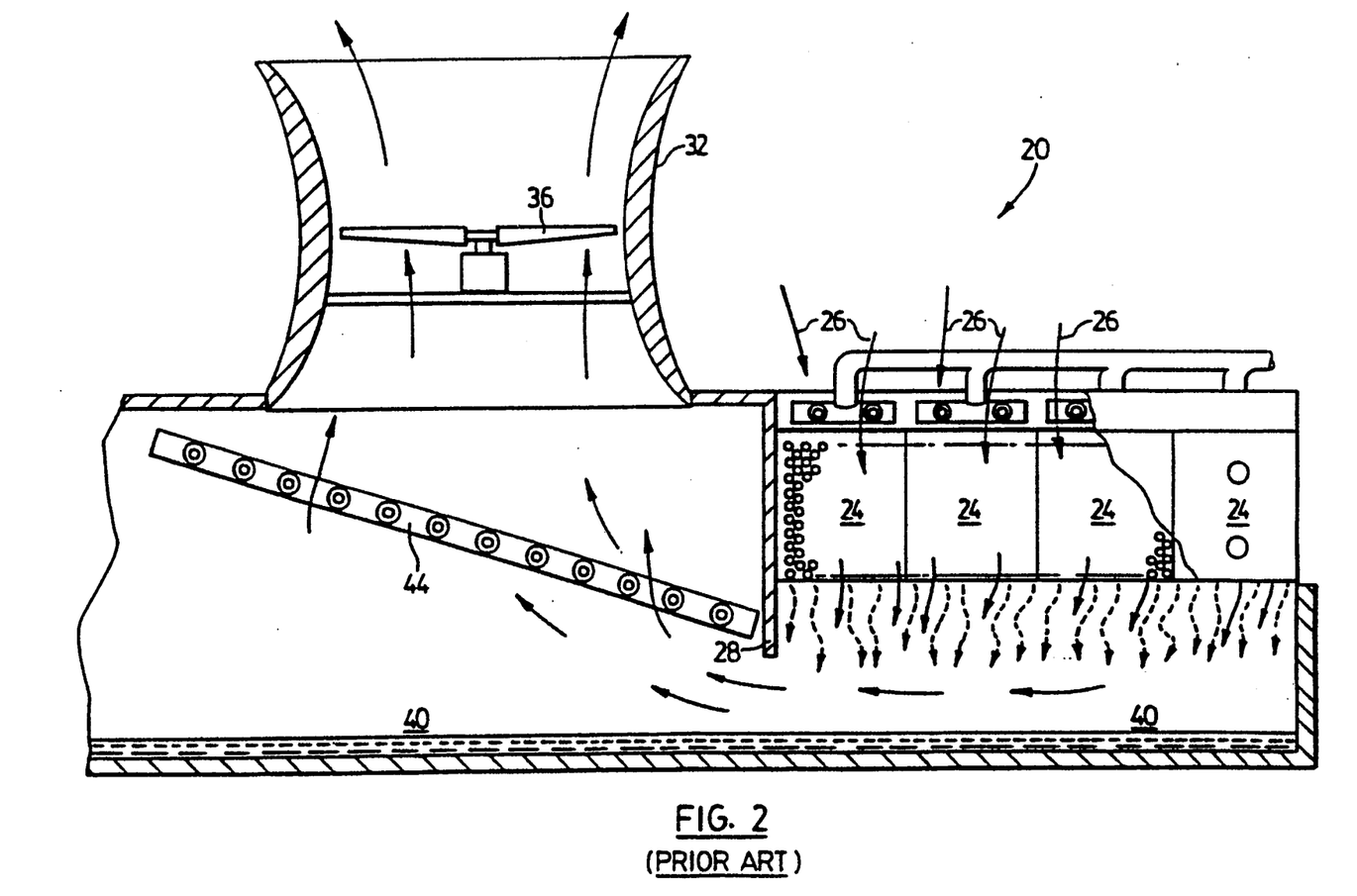
FIG. 2 shows a cut-away elevation of a portion of the prior art closed loop evaporative heat exchanger system of FIG. 1.

FIGS. 1 and 2 indicate a prior art closed loop evaporative heat exchange system generally at 20. The evaporative heat exchange system 20 includes heat exchanger coils 24 which are tube bundles and spray sections, such as those manufactured by Resorcon Inc. (Buffalo, N.Y. and Pittsburgh, Pa.) and essentially comprise a bundle of parallel horizontal pipes (tubes) through which the working fluid to be cooled is passed. Low energy (cold) air 26 is drawn vertically downward through the coils 24 and, at the same time, water is sprayed down onto the pipes in coils 24 to facilitate the heat transfer from the working fluid to the low energy air. The operation of such heat exchange coils is well known to those of skill in the art and thus need not be discussed in further detail herein.

As best seen in FIG. 2, the low energy air 26 is drawn down through heat exchanger coils 24, under a dividing wall 28 and up through stack 32 by a low velocity, high volume fan 36. The water sprayed onto the coils falls from the bottom of the heat exchanger coils 24 (as indicated by the dashed arrows) to collect in a basin 40 formed in the bottom of the closed loop evaporative heat exchange system 20. A pump, not shown, recycles water from basin 40 to supply the sprays which are directed onto the coils.

As mentioned above, when low energy air 26 is heated during its passage through heat exchanger coils 24, its capacity to hold water vapour is increased (i.e. —its relative humidity is decreased). Thus, the warmed low energy air acquires water vapour from the water sprayed onto the coils 24. When this air is exhausted from the stacks 32, the water vapour in the exhaust air will condense out when the temperature of the exhausted air drops to its saturation point, i.e.—the temperature at which the air contains more water vapour than it can hold.

To avoid the formation of a plume of condensed water vapour (fog) in the air exhausted from stacks 32, it is common in the prior art to provide a reheat stage to increase the temperature of the air exhausted from stacks 32. The intent of this reheat operation is to attempt to ensure that by the time the temperature of the exhausted air approaches its saturation point, it has travelled sufficient distance from the heat exchange system and/or has dispersed to the point where the condensing water vapour is either not visible or poses little concern. In FIGS. 1 and 2, a reheat means 44 is shown which comprises a series of heating tubes through which hot fluid is passed to heat the air to be exhausted prior to its entering stacks 32. In other prior art systems, direct gas-fired burners have been employed to accomplish a similar result.

As described above, some of the problems with the prior art closed loop evaporative heat exchange systems are: (i) the water lost as water vapour in the air which is exhausted must be replaced, requiring make-up water to be supplied continuously during operation of the system; (ii) the resulting concentration of contaminants in the water in the system basin necessitates the bleed-off and replacement of a portion of the water and the treatment of the bleed-off water; (iii) a visible plume and/or localized precipitation and icing may occur; and (iv) energy is often required to reheat the exhausted air to delay formation of the plume.

Figure 3:
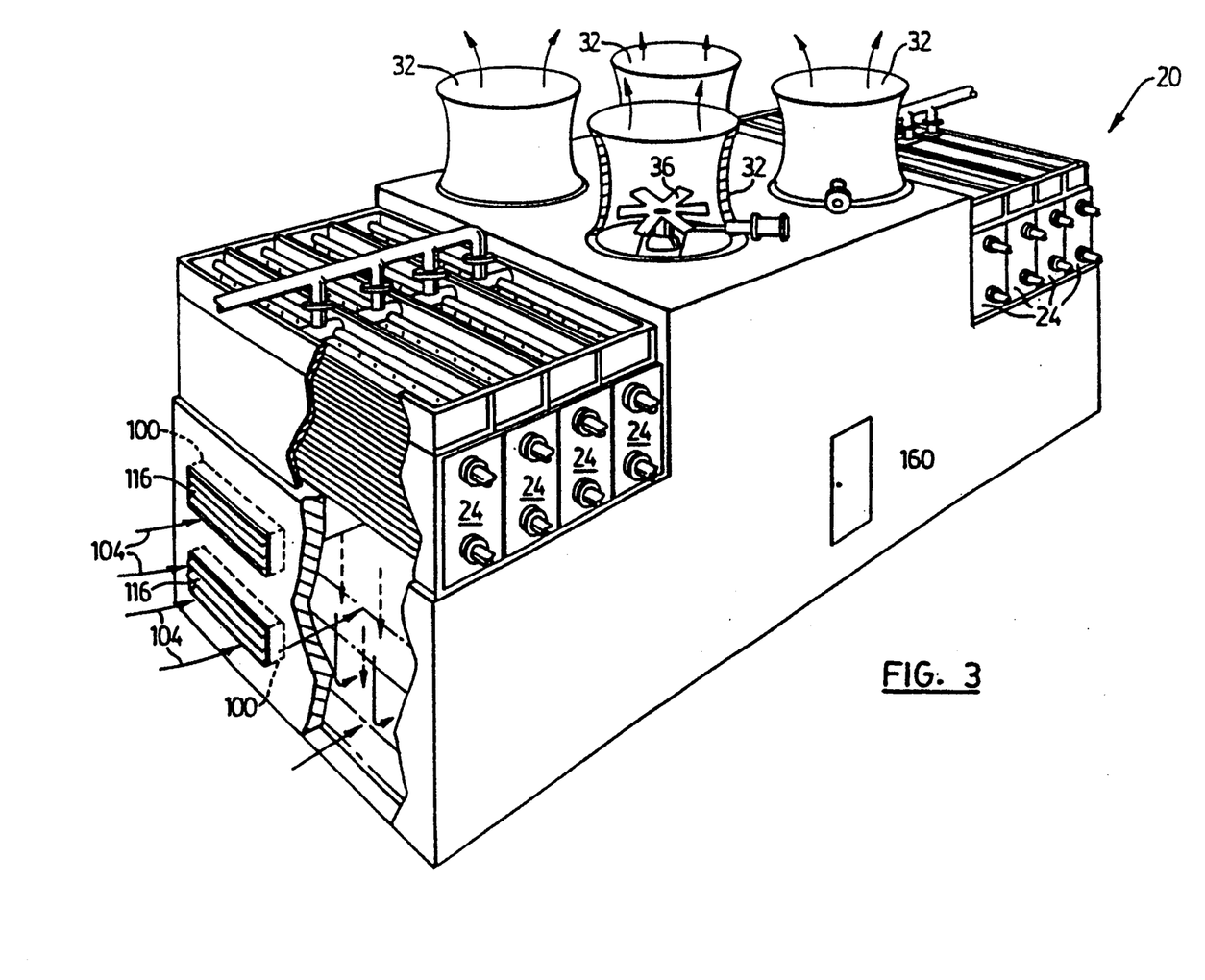
FIG. 3 shows a cut-away, perspective view of a closed loop evaporative heat exchanger system in accordance with the present invention.
Figure 4:
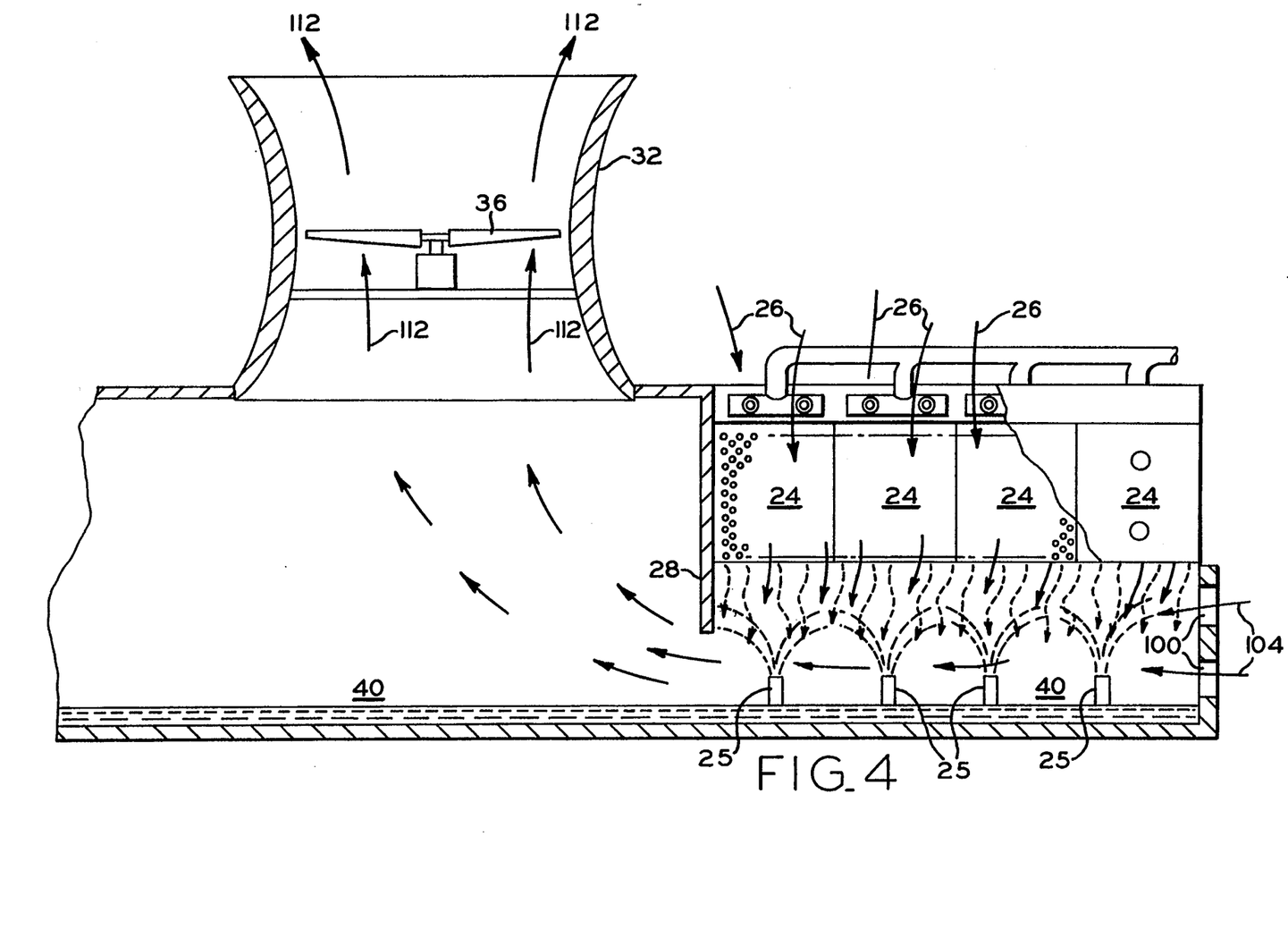
FIG. 4 shows a cut-away elevation of a portion of the closed loop evaporative heat exchanger system of FIG. 3.

FIGS. 3 and 4 show an embodiment of the present invention wherein like components to those in FIGS. 1 and 2 are indicated with like reference numerals. It will be readily apparent to those of skill in the art that the closed loop evaporative heat exchange system 20 shown in the Figures is substantially similar to that shown in FIGS. 1 and 2 with the addition of cooling air inlet ports 100 described below.

As in the prior art described above, in the closed loop evaporative heat exchange system 20 of FIGS. 2 and 3 low energy air 26 passes through coils 24 and is warmed and mixed with water vapour from the water sprays to form moist warm air 108. Cooling air inlet ports 100 introduce cooling air 104 (i.e. at a lower temperature than moist warm air 108) to the region below the heat exchanger coils 24. The source of cooling air 104 is not particularly limited and may be ambient air or air from another portion of the plant, etc.

Within the area below heat exchange coils 24, cool air 104 is mixed with moist warm air 108 to obtain a mixture of the two airflows prior to moist warm air 108 passing dividing wall 28. This mixing of moist warm air 108 with cool air 104 results in at least a portion of the water vapour in moist warm air 108 condensing, allowing the condensed water to be collected in basin 40. The droplets of un-evaporated spray water passing through the moisture of moist warm air 108 and cool air 104 to basin 40 provide both a mixing action and promote condensation of the water vapour through a 'seeding' action. Thus, the exhaust air 112 which exits stack 32 has a reduced water vapour content when compared to the air which would be exhausted if no cooling air 104 was introduced to closed loop evaporative heat exchange system 20.

As well as condensing water vapour for collection, an additional advantage is provided by the present invention in that cooling air 104 also acts to lower the temperature of the un-evaporated spray water which collects in basin 40. As will be apparent to those of skill in the art, this reduction of the spray water temperature results in an increase in the cooling capacity of the system 20.

It is contemplated that cooling air 104 will inherently be adequately mixed with moist warm air 108 by the combining of the two air flows in the area beneath coils 24 and by the action of the cooling water droplets (indicated by the dashed arrows) falling to basin 40. However, in particular cases wherein additional mixing is desired, it is contemplated that there may be provided additional means to promote mixing such as: a series of spaced baffles through the area beneath coils 24 and prior to dividing wall 28; or additional water sprays 25 through the same area, etc. In this latter case, it is also contemplated that these additional sprays will provide an additional 'seeding' action, further promoting the condensation of water vapour.

Cooling air inlet ports 100 will be sized to provide the necessary airflow to meet worst case operating conditions. To control the amount of cooling air 104 which is drawn into closed loop evaporative heat exchange system 20 by the static pressure drop which occurs across coils 24, dampers 116 may be provided. During operation in hot weather for example, where maximum cooling capacity is required and water loss and plume formation may have a reduced priority, dampers 116 may be substantially closed to minimize the amount of cooling air 104 which enters closed loop evaporative heat exchange system 20. Conversely, in very cold weather where cooling capacity is not critical and where plume formation is particularly undesirable, dampers 116 may be fully opened.

While the present invention will reduce the moisture content of exhaust air 112, it is contemplated that in some circumstances it may still be required to provide a reheat assembly, albeit one of less capacity than would otherwise be required. Further, in some circumstances it may also be desired to provide drift eliminators before fans 36 to reduce or eliminate condensed moisture from exiting closed loop evaporative heat exchange system 20. Also, fans 36 may be variable capacity fans which are adjusted as appropriate to reduce or eliminate condensed moisture from exiting closed loop evaporative heat exchange system 20 while maintaining an adequate flow rate of low energy air through the system 20. In this case, energy savings resulting from lower capacity operation of fans 36 may provide an additional reduction in operating expenses.

Figure 5:
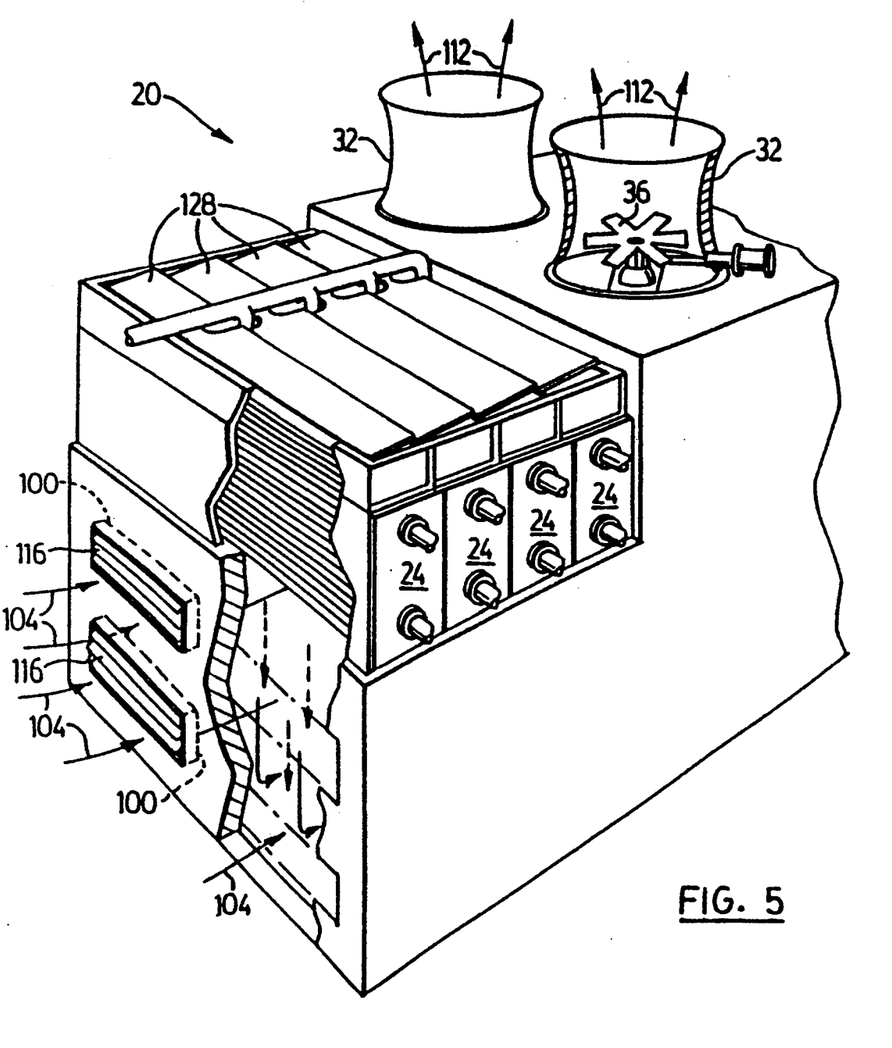
FIG. 5 shows a perspective view of a portion of another embodiment of a closed loop evaporative heat exchanger system in accordance with the present invention.

FIG. 5 shows another embodiment of the present invention wherein additional control is provided to alter the amount of cooling air 104 which enters closed loop evaporative heat exchange system 20. In this embodiment, dampers 128 are provided in addition to dampers 116, with dampers 128 serving to control the amount of low energy air 26 entering closed loop evaporative heat exchange system 20 by effectively allowing control of the static pressure drop through coils 24. By controlling both dampers 116 and damper 128, it is contemplated that a wide range of operating conditions may be satisfied.

Figure 6:
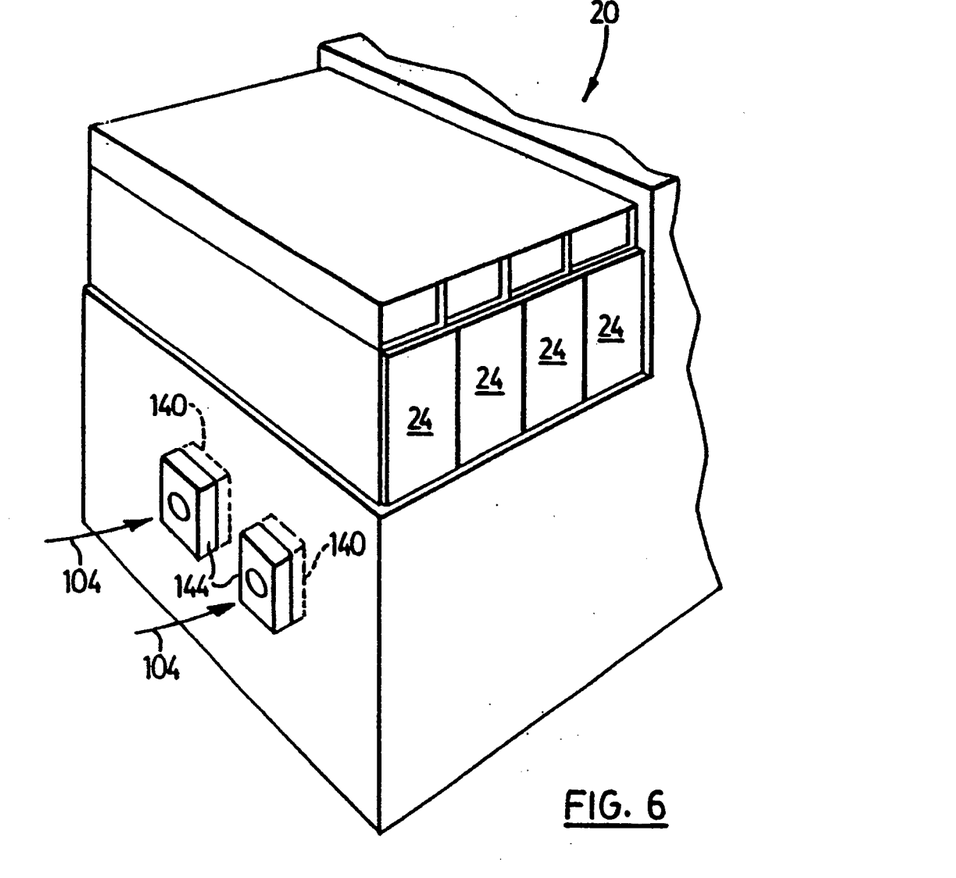
FIG. 6 shows a perspective view of a portion of another embodiment of a closed loop evaporative heat exchanger system in accordance with the present invention.

One of the contemplated advantages of the present invention is that it may be retrofitted to existing closed loop evaporative heat exchange system facilities. However, in some circumstances it may not be possible, or will be otherwise undesirable, to provide cooling air inlet ports 100 of the size necessary to provide the desired maximum airflow. As shown in FIG. 6, in such circumstances, cooling air inlet ports 140 of reduced size may be provided in combination with forced air units 144. Forced air units 144 may comprise high velocity fans sized to provide the necessary maximum airflow of cooling air 104, the velocity of the airflow assisting in the mixing of moist warm air 108 and cool air 104.

Figure 7:
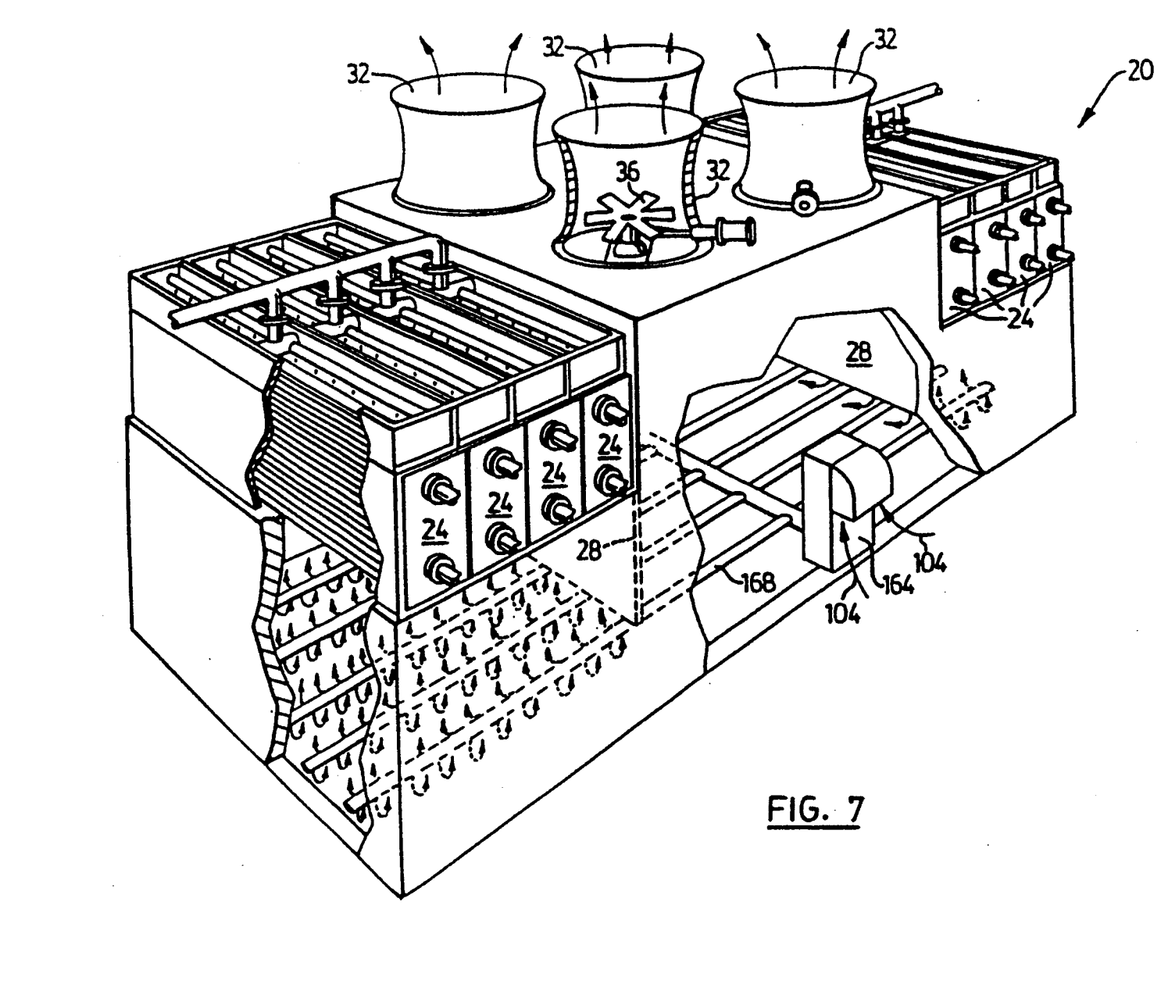
FIG. 7 shows a cut-away perspective view of another embodiment of a closed loop evaporative heat exchanger system in accordance with the present invention.

In some circumstances, it may be impractical to provide any cooling air inlet ports 100. In such a case, an existing opening into the closed loop evaporative heat exchange system may be used to accomplish admission of cooling air. In FIG. 7, a service access door (not shown in the Figure but similar to that identified at 160 in FIG. 3) is removed and a high capacity forced air unit 164 is inserted. Depending upon the location of the existing opening, duct work 168 may be required to direct the cooling air 104 to the desired region within closed loop evaporative heat exchange system 20. In the Figure, cooling air 104 is forced through duct work 168 by forced air unit 164 to the region of closed loop evaporative heat exchange system 20 below heat exchange coils 24.

Of course, depending upon the particular closed loop evaporative heat exchange system and its contemplated operating conditions, a combination of forced air units and control dampers may also be employed.

Operation of the closed loop evaporative heat exchange system shown in FIGS. 3 and 4 will, at its most sophisticated, involve the monitoring of: ambient air temperature and relative humidity; the temperature and relative humidity of the mixed cooling air 104 and moist warm air 108; and the condensing pressure and/or temperature of the working fluid. This data may be gathered through appropriate sensors in and about closed loop evaporative heat exchange system 20 and applied to a control system. Such a control system would monitor the received data and compare it to appropriate psychrometric data to determine the correct settings for: dampers (116,128); forced air systems (144,164); variable speed fans 36; and/or the amount of reheat (if any) applied to the exhausted air. The advantage of this approach of operating the closed loop evaporative heat exchange system is that water loss and/or the reheat requirement may be minimized.

At its least sophisticated, operation of the closed loop evaporative heat exchange system will involve visual monitoring of the air exhausted from the closed loop evaporative heat exchange system by operators and manual control of at least some of: dampers (116,128), forced air systems (144,164), variable speed fans; and/or the amount of reheat (if any) applied to the exhausted air to minimize a visible plume.

The present invention provides a novel method of operating a closed loop evaporative heat exchange system to reduce the water vapour in the exhaust gas from the system. Essentially, this is accomplished by altering conditions within the system such that at least some water vapour is condensed out of the gas to be exhausted from the system, prior to that gas actually leaving the system. This condensed vapour is thus recovered for reuse within the system. Additionally, as the temperature of the spray water which collects in the basin is also reduced by the cooling air, an increase in the cooling capacity of the system is increased.

The present invention also provides a novel closed loop evaporative heat exchange system wherein cooling air is mixed with the low energy air which has been heated and humidified to condense at least a portion of the water vapour out of the air, prior to its being exhausted from the plant.

We claim:

1. A method of reducing water vapour in exhaust gas from a closed loop evaporative heat exchange system, comprising the steps of:
   (i) passing a working fluid to be cooled through at least one closed loop heat exchanger;
   (ii) applying a water spray to said at least one heat exchanger to wet its surface;
   (iii) passing air of lower energy than said working fluid past said at least one heat exchanger, said lower energy air acquiring heat energy from said at least one heat exchanger and acquiring water vapour from an evaporated portion of the water spray applied to said at least one heat exchanger to form warm moist air;
   (iv) collecting un-evaporated water spray in a collection means;
   (v) mixing, in a region between said at least one heat exchanger and said collection means, said region traversed by said un-evaporated water spray, the warm moist air with an amount of cooler air to condense at least a portion of the water vapour in the mixture to obtain exhaust air and condensed water vapour;
   (vi) recovering at least a portion of the condensed water vapour for reuse;
   (vii) exhausting said exhaust air from said heat exchange system.

2. The method of claim 1 wherein the amount of said cooler air which is mixed with said warm moist air is controlled by a damper.

3. The method of claim 1 wherein dampers are employed to limit the relative amounts of said cooler air and said moist warm air which are mixed.

4. The method of claim 1 wherein said cooler air is supplied from a forced air supply means.

5. The method of claim 1 wherein a water spray is provided to assist in the mixing of step (v).

6. The method of claim 1 wherein said cooler air is ambient air.

7. The method of claim 1 wherein a variable capacity fan passes said lower energy air past said at least one heat exchanger.

8. A closed loop evaporative heat exchange system comprising:
   at least one closed loop heat exchanger;
   means to provide a water spray onto said at least one heat exchanger;
   means to supply low energy air past said at least one heat exchanger;
   means to supply cooler air;
   means to collect an un-evaporated portion of said water spray;
   means to mix, within a region between said at least one heat exchanger and said means to collect, said region traversed by the un-evaporated portion of said water spray, said cooler air with the low energy air which has passed said at least one heat exchanger to condense water vapour therefrom for collection in said means to collect; and
   exhaust means to exhaust said mix of cooler air and low energy air from said heat exchange system.

9. The closed loop evaporative heat exchange system of claim 8 further comprising cooler air control means to alter the supply of said cooler air.

10. The closed loop evaporative heat exchanger system of claim 9 further comprising means to alter the static pressure drop of said low energy air across said at least one heat exchanger.

11. The closed loop evaporative heat exchanger system of claim 9 wherein said control means comprises a forced air supply system.

12. The closed loop evaporative heat exchanger system of claim 9 wherein said cooler air control means comprises a damper.

13. The closed loop evaporative heat exchanger system of claim 8 wherein said means to supply low energy air is a variable capacity fan.

* * * * *